United States Patent [19]

Heritage et al.

[11] 3,854,071

[45] Dec. 10, 1974

[54] EXPOSURE REGULATED SCANNING ILLUMINATION MEANS FOR ELECTRON PROJECTION SYSTEMS

[75] Inventors: Marcus B. Heritage, Katonah; George A. Wardly, Yorktown Heights, both of N.Y.

[73] Assignee: International Business Machines Corporation, Armonk, N.Y.

[22] Filed: Dec. 14, 1972

[21] Appl. No.: 315,246

[52] U.S. Cl. .................................. 315/30, 315/31 R
[51] Int. Cl. .................................. H01j 29/52
[58] Field of Search ................ 315/30, 31 R, 31 TV

[56] References Cited

UNITED STATES PATENTS

| | | | |
|---|---|---|---|
| 3,334,180 | 8/1967 | Loughlin | 315/30 X |
| 3,418,520 | 12/1968 | Barber et al. | 315/30 X |
| 3,445,717 | 5/1969 | Eckenbrecht et al. | 315/30 X |

*Primary Examiner*—Leland A. Sebastian
*Assistant Examiner*—P. A. Nelson
*Attorney, Agent, or Firm*—M. H. Klitzman; J. G. Cockburn; J. J. Goodwin

[57] ABSTRACT

The present invention relates to circuit means for use in combination with an electron beam projection system of the type wherein an image is projected onto a wafer by means of a scanning electron beam. The circuit means is employed to provide a regulated scan rate. In the system either the secondary electron current from the wafer or the wafer current itself is used to drive a pre-amplifier, the output of which is sent to a pair of attenuator networks to provide scan control. The outputs of the attenuators are fed to a pair of integrating amplifiers, the outputs of which are used to drive a pair of deflection amplifiers after passing through a pair of scan limit detectors and flyback circuits. The outputs of the deflection amplifiers are used to drive the X and Y deflection coils located before the final condenser lens.

5 Claims, 1 Drawing Figure

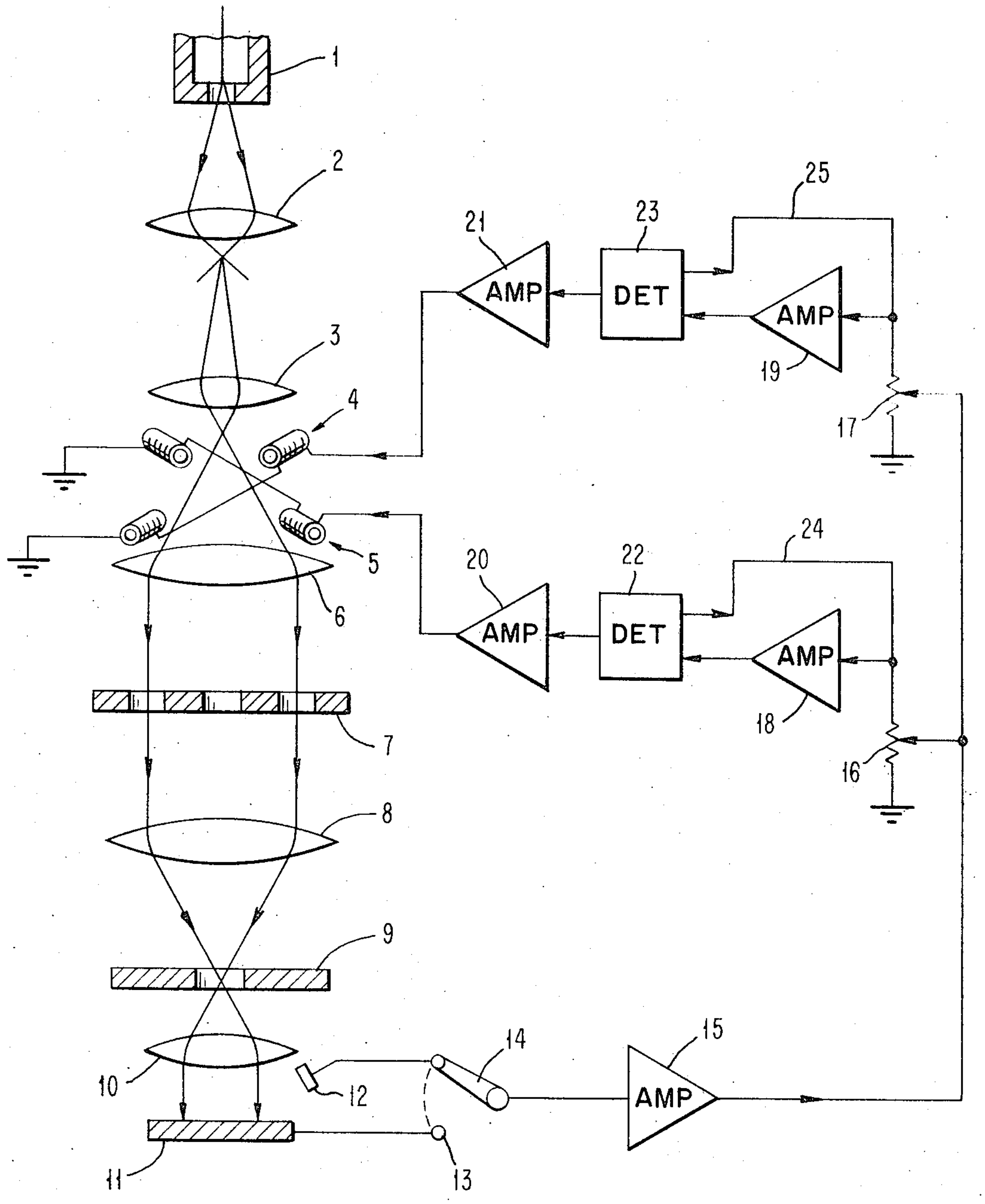
AMP
DET
AMP
AMP
DET
AMP
AMP
1
2
3
4
5
6
7
8
9
10
11
12
13
14
15
16
17
18
19
20
21
22
23
24
25

EXPOSURE REGULATED SCANNING ILLUMINATION MEANS FOR ELECTRON PROJECTION SYSTEMS

BACKGROUND OF THE INVENTION

1. Field of the Invention

The present invention relates to the field of electron beam systems and more particularly to electronic scan control means for such systems.

2. Summary of the Invention

In an electron projection system of the type wherein an electron beam is scanned across a semiconductor chip, an object of the present invention is to provide a regulated scan rate deflection system whose instantaneous scan velocity is proportional to the current falling on the chip in order to provide uniform exposure regardless of the size, shape and current variations in the electron beam which strike the chip.

The foregoing and other objects, features and advantages of the invention will be apparent from the more particular description of the preferred embodiment of the invention, as illustrated in the accompanying drawing.

BRIEF DESCRIPTION OF THE DRAWING

The FIGURE shows an electron beam projection system including a feedback circuit for regulating scan rate according to the principles of the present invention.

DESCRIPTION OF THE PREFERRED EMBODIMENT

In electron projection systems using a raster scanned illumination source, the portion of the image projected at any instant varies as a complex function of the scan. Driving the scan in a closed loop, dependent on the total current in the image provides a uniform dose in the image.

In any projection system, whether light optical or electron optical, the function of the condenser lenses is to focus light passing through the mask into the entrance pupil of the projection lens. Spherical aberration in the condenser lenses causes a loss of illumination which can be overcome by using a larger illuminating source than would otherwise be required. While it is possible to use large sources of relatively low brightness in electron optical projection systems for microfabrication, the need for a high brightness and consequently relatively small source for registration and focussing demands that the latter source be used.

The electron beam system of FIG. 1 illustrates that a small illuminating source can be made to appear as a large virtual source by deflection of the illumination before the final condenser lens. However, the effect of spherical aberration in the condenser lenses is such that the portion of the final image projected at any one instant varies in a complex way during the scan. Slight changes in the electron gun conditions can also add a time varying condition.

Considering conventional approaches, neither driving the scan at a fixed rate nor in some predetermined functional manner provides a satisfactory solution, since in the first case a non-uniform exposure of resist occurs and in the second, the function may be difficult to generate and time variations would again result in a non-uniform exposure.

The invention as illustrated in FIG. 1 is to provide a regulated scan rate whose instantaneous scan velocity is proportional to the current falling on the wafer. This achieves startling simplicity and will provide uniform exposure in spite of size, shape and current variations in the electron beam, which strikes the wafer, individually and collectively.

FIG. 1 is a schematic diagram of an embodiment of a projection system with an accompanying block circuit diagram to show the means by which the invention is realized. The projection system includes an electron beam source 1, a first condenser lens 2, a second condenser lens 3, X deflection coils 4, Y deflection coils 5, a final condenser lens 6, a mask 7, a first projection lens 8, an aperture 9, a final projection lens 10 and a wafer 11. As thus far described, this is a conventional electron beam projection system. The first element of the scan control feedback system is a means to detect the effect of the electron beam on the wafer as the electron beam scans the wafer in raster fashion.

Since secondary electron current is proportional to wafer current, either can be used in the feedback system. Thus, a secondary electron detector 12 is provided and a terminal 13 is attached to wafer 11. Switch 14 is provided so that either the secondary electron current or the wafer current may be used at the option of the user. Either the secondary electron current or the wafer current through switch 14 is used to drive a pre-amplifier 15. The output of pre-amplifier 15 is sent to a pair of attenuators 16 and 17 to provide scan control. The outputs of the attenuators 16 and 17 are fed to integrating amplifiers 18 and 19 whose output is ultimately used to drive deflection amplifiers 20 and 21 which produce deflection coil currents in the X- and Y-coils 4 and 5. Scan limit detectors and flyback circuits 22 and 23 are shown interposed between the integrating amplifiers 19 and 18 and the deflection amplifiers 21 and 20. The function of this is to sense when the maximum desired scan amplitude is attained in either direction and to provide a retrace of the beam back to its respective starting point. To allow the integrating amplifiers 19 and 18 to accept the flyback, schematic control loops 24 and 25 are shown between the scan limit detectors 22 and 23 and attenuators 16 and 17 although other methods could be used.

A mathematical description will now be provided to show that the described configuration assures uniform exposure on the wafer 11. The X-scan rate will vary proportionately to the total current, $I$, hitting the wafer. That is:

$$dx/dt = K_x I,$$

where $K_x$ is rate constant.

As the electron beam is scanned in the X-direction, its position is:

$$X = K_x \int_0^t I dt - M_x \underline{X} = K_x Q(t) - M_x \underline{X}$$

where $\underline{X}$ is the total scan amplitude in X-direction and $M_x$ is the number of flybacks which have occurred and $Q(t)$ is the total charge that has been deposited.

Stated in other words, the charge per unit length, in the X-direction, is constant and equal to $1/K_x$. The same is true for the Y-direction.

$$dy/dt = K_y I$$

or:

$$Y = K_y \int_0^t I dt - M_y Y = K_y Q(t) - M_y Y$$

From the above equations, it is clear that the raster slope is constant.

$dy/dx = (dy/dt)/(dx/dt) = (K_y I)/(K_x I) = K_y/K_x =$ constant

Therefore, the raster will be composed of parallel scans with equal spacing. The spacing of scans will be:

$\Delta y = dy/dx\ \underline{\overline{X}} = K_y/K_x\ \underline{\overline{X}}$ and should be made smaller, by about a factor of 10, than the minimum beam spot dimension in the Y-direction, by suitable choice of $K_Y/K_x$.

Now, if at any location on the image plane, the "width" (or Y-extent) of the scan line is $\delta y$, the exposure, $dE$, for that line is $dE = 1/K_x \delta_y$ (coulombs sq.cm.)

Now, by choice, $\delta y >> \Delta y$ so that the number, $N$, of scans which contribute exposure to this location is $$N = \delta y/\Delta y$$

such that the total exposure at this location is $$E = N\ dE = (\delta y/\Delta y)\ (1/K_x \delta y) = 1/K_x \Delta y$$

Thus, any arbitrary location has uniform exposure. Thus, the described circuit will compensate for any change in wafer current, $I$, whether the variation is caused by current density, and/or size, and/or shape changes of the electron beam.

The restrictions imposed are that $\delta y >> \Delta y$ which means that there are many scan overlaps and that the relative change in $\delta y$, "the spot width," should be small for a Y-displacement of $\delta y$. In the projection system described, both conditions can be met by operation by one skilled in the art.

A third condition that should be met is that the average local opacity of the mask 11 should be nominally constant over the whole mask.

The described technique can also be applied to any type of scanned electron beam system requiring a constant quantity of charge deposited in a unit area. In electron probe microfabrication systems, modulating the scan rates in continuously scanning systems or the dwell time in stepped systems, in a similar way, can be used to compensate for changes in electron gun brightness and changes in edge slope of the spot. In these cases, an appropriate time averaged current should be used to drive the scan system.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an electron beam projection system of the type including at least an electron beam source, a pair of deflection coils, for deflecting said electron beam in a raster mode and a target wafer onto which said electron beam is projected and scanned, the combination comprising:

means for providing a regulated scanning rate for said system so that the instantaneous scan velocity is proportional to the current falling on the target wafer, said means including:

means for detecting electron current from said target wafer being scanned by said electron beam;

first and second feedback circuits connected to said electron current detection means, each of said feedback circuits including an attenuator means to provide a scan control signal, a deflection amplifier means connected to separate ones of said pair of deflection coils to produce deflection currents in said deflection coils;

an integrating amplifier means interconnected to said attenuator means for integrating the electron current from said target wafer; and a scan limit detector means connected to said deflection amplifier means in each of said feedback circuits to detect when a given desired amplitude is attained by said deflection coil to provide a retrace of said electron beam back to its initial point.

2. An electron beam projection system according to claim 1 wherein said means for detecting said electron current from said target wafer is a means for detecting the secondary electron current from said wafer.

3. An electron beam projection system according to claim 1 wherein said means for detecting said electron current from said target wafer is a means connected to said wafer for directly detecting the wafer current.

4. An electron beam projection system according to claim 1 further including a separate scan limit detector connected to the output of said integrating amplifier means in each of said feedback circuits, and a separate deflection amplifier connected between said scan limit detectors and a separate one of said pairs of deflection coils, said scan limit detectors functioning to sense a desired maximum scan amplitude of said electron beam.

5. An electron beam projection system according to claim 4 further including a feedback connection between said scan limit detector and said attenuator circuit in each of said feedback circuits for providing a retrace signal when said desired maximum scan amplitude of said electron beam is attained.

* * * * *